United States Patent
Schloter

(10) Patent No.: US 8,775,452 B2
(45) Date of Patent: Jul. 8, 2014

(54) METHOD, APPARATUS AND COMPUTER PROGRAM PRODUCT FOR PROVIDING STANDARD REAL WORLD TO VIRTUAL WORLD LINKS

(75) Inventor: Philipp Schloter, San Francisco, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/855,430

(22) Filed: Sep. 14, 2007

(65) Prior Publication Data

US 2008/0071750 A1    Mar. 20, 2008

Related U.S. Application Data

(60) Provisional application No. 60/825,921, filed on Sep. 17, 2006.

(51) Int. Cl.
*G06F 17/30* (2006.01)

(52) U.S. Cl.
USPC ............................. 707/758; 707/770; 725/105

(58) Field of Classification Search
USPC .................. 707/3, 6, 770, 758, 707; 725/105; 382/305
See application file for complete search history.

(56) References Cited

U.S. PATENT DOCUMENTS

| | | | |
|---|---|---|---|
| 5,111,511 A | 5/1992 | Ishii et al. | |
| 5,588,067 A | 12/1996 | Peterson et al. | |
| 5,859,920 A | 1/1999 | Daly et al. | |
| 5,872,604 A | 2/1999 | Ogura | |
| 5,908,465 A * | 6/1999 | Ito et al. | 701/532 |
| 5,991,739 A * | 11/1999 | Cupps et al. | 705/26 |
| 6,081,629 A | 6/2000 | Browning | |
| 6,192,078 B1 | 2/2001 | Komiya et al. | |
| 6,208,353 B1 | 3/2001 | Ayer et al. | |
| 6,373,970 B1 | 4/2002 | Dong et al. | |
| 6,415,057 B1 | 7/2002 | Suzuki et al. | |
| 6,434,254 B1 | 8/2002 | Wixson | |
| 6,476,830 B1 | 11/2002 | Farmer et al. | |
| 6,529,613 B1 | 3/2003 | Astle | |
| 6,709,387 B1 | 3/2004 | Glukhovsky et al. | |
| 6,804,606 B2 | 10/2004 | Jones | |
| 6,850,252 B1 | 2/2005 | Hoffberg | |
| 6,948,135 B1 | 9/2005 | Ruthfield et al. | |

(Continued)

FOREIGN PATENT DOCUMENTS

EP    1 315 102 A2    5/2003
EP    1 473 634 A1    11/2004

(Continued)

OTHER PUBLICATIONS

Chinese office action for CN application No. 200780038578.4 dated Sep. 9, 2010, pp. 1-12.

(Continued)

*Primary Examiner* — Cam Truong
(74) *Attorney, Agent, or Firm* — Ditthavong & Steiner, P.C.

(57) ABSTRACT

An apparatus for providing standard real world to virtual world links may include a processing element configured to receive indications of an image including an object, determine whether the object corresponds to a particular object having a predefined association based on a recognition of the object, and execute a function corresponding to the predefined association in response to the object corresponding to the particular object.

20 Claims, 4 Drawing Sheets

(56) References Cited

U.S. PATENT DOCUMENTS

| | | | |
|---|---|---|---|
| 6,980,671 B2 | 12/2005 | Liu et al. | |
| 6,988,990 B2 | 1/2006 | Pan et al. | |
| 7,009,579 B1 | 3/2006 | Kondo et al. | |
| 7,019,723 B2 | 3/2006 | Tsuji | |
| 7,093,012 B2 | 8/2006 | Olstad et al. | |
| 7,154,538 B1* | 12/2006 | Fukasawa et al. | 348/211.3 |
| 7,174,035 B2 | 2/2007 | Liu et al. | |
| 7,200,597 B1* | 4/2007 | Grizzard | 707/10 |
| 7,203,674 B2 | 4/2007 | Cohen | |
| 7,336,710 B2 | 2/2008 | Kim et al. | |
| 7,339,460 B2 | 3/2008 | Lane et al. | |
| 7,346,217 B1 | 3/2008 | Gold, Jr. | |
| 7,421,724 B2* | 9/2008 | Klosterman et al. | 725/42 |
| 7,436,984 B2 | 10/2008 | Auberger | |
| 7,818,336 B1 | 10/2010 | Amidon et al. | |
| 2001/0014891 A1 | 8/2001 | Hoffert et al. | |
| 2001/0027475 A1 | 10/2001 | Givol et al. | |
| 2002/0082901 A1 | 6/2002 | Dunning et al. | |
| 2002/0087263 A1 | 7/2002 | Wiener | |
| 2002/0113757 A1 | 8/2002 | Hoisko | |
| 2002/0151283 A1 | 10/2002 | Pallakoff | |
| 2002/0194351 A1 | 12/2002 | Nishimura et al. | |
| 2003/0023150 A1 | 1/2003 | Yokoi et al. | |
| 2003/0040866 A1 | 2/2003 | Kawakami | |
| 2003/0063770 A1 | 4/2003 | Svendsen et al. | |
| 2003/0065661 A1 | 4/2003 | Chang et al. | |
| 2003/0156208 A1* | 8/2003 | Obradovich | 348/231.3 |
| 2003/0165276 A1 | 9/2003 | Seeger et al. | |
| 2003/0191737 A1 | 10/2003 | Steele et al. | |
| 2003/0206658 A1 | 11/2003 | Mauro et al. | |
| 2003/0219146 A1 | 11/2003 | Jepson et al. | |
| 2004/0008262 A1 | 1/2004 | Silverbrook | |
| 2004/0008274 A1 | 1/2004 | Ikari et al. | |
| 2004/0054659 A1 | 3/2004 | McIntyre | |
| 2004/0097190 A1 | 5/2004 | Durrant et al. | |
| 2004/0143569 A1 | 7/2004 | Gross et al. | |
| 2004/0148275 A1 | 7/2004 | Achlioptas | |
| 2004/0189816 A1* | 9/2004 | Nakazawa et al. | 348/211.2 |
| 2004/0202245 A1 | 10/2004 | Murakami et al. | |
| 2004/0208372 A1* | 10/2004 | Boncyk et al. | 707/104.1 |
| 2004/0212677 A1 | 10/2004 | Uebbing | |
| 2004/0212678 A1 | 10/2004 | Cooper et al. | |
| 2004/0215523 A1 | 10/2004 | Wulff et al. | |
| 2004/0267700 A1 | 12/2004 | Dumais et al. | |
| 2005/0015370 A1 | 1/2005 | Stavely et al. | |
| 2005/0025368 A1 | 2/2005 | Glukhovsky | |
| 2005/0027705 A1 | 2/2005 | Sadri et al. | |
| 2005/0030404 A1 | 2/2005 | Takahashi et al. | |
| 2005/0110746 A1 | 5/2005 | Hou | |
| 2005/0149423 A1 | 7/2005 | Roseme et al. | |
| 2005/0171832 A1 | 8/2005 | Hull et al. | |
| 2005/0185060 A1 | 8/2005 | Neven, Sr. | |
| 2005/0221821 A1 | 10/2005 | Sokola et al. | |
| 2005/0246324 A1 | 11/2005 | Paalasmaa et al. | |
| 2005/0249438 A1 | 11/2005 | Lapstun et al. | |
| 2005/0285941 A1 | 12/2005 | Haigh et al. | |
| 2006/0002607 A1 | 1/2006 | Boncyk et al. | |
| 2006/0012677 A1 | 1/2006 | Neven, Sr. et al. | |
| 2006/0033809 A1 | 2/2006 | Farley | |
| 2006/0036565 A1 | 2/2006 | Bruecken | |
| 2006/0064732 A1 | 3/2006 | Hirosawa et al. | |
| 2006/0069503 A1* | 3/2006 | Suomela et al. | 701/211 |
| 2006/0069577 A1* | 3/2006 | Schmitt et al. | 705/1 |
| 2006/0069674 A1 | 3/2006 | Palmon et al. | |
| 2006/0089792 A1 | 4/2006 | Manber et al. | |
| 2006/0098237 A1 | 5/2006 | Steinberg et al. | |
| 2006/0098891 A1 | 5/2006 | Steinberg et al. | |
| 2006/0112067 A1* | 5/2006 | Morris | 707/1 |
| 2006/0143016 A1 | 6/2006 | Jones et al. | |
| 2006/0174203 A1 | 8/2006 | Jung et al. | |
| 2006/0203903 A1 | 9/2006 | Shih et al. | |
| 2006/0206379 A1 | 9/2006 | Rosenberg | |
| 2006/0248061 A1 | 11/2006 | Kulakow et al. | |
| 2006/0253226 A1* | 11/2006 | Mendelson | 701/1 |
| 2007/0019723 A1 | 1/2007 | Valente | |
| 2007/0024527 A1* | 2/2007 | Heikkinen et al. | 345/9 |
| 2007/0055439 A1* | 3/2007 | Denker et al. | 701/200 |
| 2007/0063050 A1 | 3/2007 | Attia et al. | |
| 2007/0106721 A1 | 5/2007 | Schloter | |
| 2007/0162942 A1* | 7/2007 | Hamynen et al. | 725/105 |
| 2007/0237506 A1 | 10/2007 | Minema et al. | |
| 2007/0283236 A1 | 12/2007 | Sugiura et al. | |
| 2008/0021697 A1* | 1/2008 | Cox et al. | 704/2 |
| 2008/0031335 A1 | 2/2008 | Inoue | |
| 2008/0071749 A1 | 3/2008 | Schloter | |
| 2008/0071750 A1 | 3/2008 | Schloter | |
| 2008/0071770 A1 | 3/2008 | Schloter et al. | |
| 2008/0071988 A1 | 3/2008 | Schloter et al. | |
| 2008/0104067 A1 | 5/2008 | Thorson et al. | |
| 2008/0133392 A1 | 6/2008 | Jung et al. | |
| 2008/0221862 A1* | 9/2008 | Guo et al. | 704/2 |
| 2008/0267504 A1 | 10/2008 | Schloter et al. | |
| 2008/0268876 A1 | 10/2008 | Gelfand et al. | |
| 2008/0270378 A1 | 10/2008 | Setlur et al. | |
| 2008/0281582 A1 | 11/2008 | Hsu et al. | |
| 2009/0083275 A1 | 3/2009 | Jacob et al. | |
| 2009/0094289 A1 | 4/2009 | Xiong et al. | |
| 2009/0102935 A1 | 4/2009 | Hung et al. | |
| 2010/0054542 A1 | 3/2010 | Archibald et al. | |
| 2010/0138191 A1 | 6/2010 | Hamilton | |

FOREIGN PATENT DOCUMENTS

| | | |
|---|---|---|
| JP | 08190115 | 7/1996 |
| WO | WO 03/032005 A2 | 4/2003 |
| WO | WO 03/041000 A1 | 5/2003 |
| WO | 2005/103980 A2 | 11/2005 |
| WO | WO 2006/050782 A1 | 5/2006 |
| WO | WO 2006/120286 A2 | 11/2006 |

OTHER PUBLICATIONS

Evaluating Associativity in CPU Caches, Hill et al., IEEE Transactions on Computers, vol. 38, No. 12, Dec. 1989, pp. 1612-1630.

Office action for related U.S. Appl. No. 11/855,419 dated Oct. 14, 2010, pp. 1-70.

Profile based caching to enhance data availability in push/pull mobile environment, Kambalakatta et al., Proc. of the first annual intl conf on mobile and ubiquitous systems: networking and services, 2004, pp. 1-10.

Chinese Office action for corresponding CN application No. 200780042622.9 dated Dec. 21, 2010, pp. 1-11.

Public Applications of SpaceTag and Their Impacts, Tarumi et al., Digital Cities, Ishida et al. (Eds.), LNCS 1765, 2000, Springer-Verlag Berlin Heidelberg, pp. 350-363.

Korean Office Action for related Kr Application No. 10-2008-7013528 dated Mar. 28, 2011, pp. 1-5.

Office Action for related U.S. App. No. 12/982,234 dated Mar. 29, 2011, pp. 1-57.

Office Action U.S. Appl. No. 11/770,452 dated Oct. 29, 2010.

Office Action U.S. Appl. No. 11/770,452 dated Apr. 15, 2011.

Ko et al. Fast Digital Image Stabilizer Based on Gray Coded Bit Plane Matching » IEEE (Jan. 1999) pp. 1-2.

Al Bovik, Handbook of Image and Video Processing, Book, 2000, 241 Pages, First Edition, Academic press, San Diego, California International Search Report from PCT/IB2008/000655 dated Jan. 22, 2009.

Office Action from Korean Appin. No. 10-2009-7024015 dated Mar. 16, 2011

English Translation of Office Action from Korean Appin. No. 10-2009-7024015 dated Mar. 16, 2011.

Final Office Action for related U.S. Appl. No. 11/855,409 dated Jul. 8, 2011, pp. 1-70.

Office Action for related U.S. Appl. No. 11/592,460 dated Sep. 16, 2011, pp. 1-100.

Office Action for related U.S. Appl. No. 11/855,419 dated Sep. 20, 2011, pp. 1-85.

Chinese Office action for corresponding CN application No. 200780041291.7 dated Jan. 26, 2011, pp. 1-6.

(56) References Cited

OTHER PUBLICATIONS

Office action for related U.S. Appl. No. 11/855,409 dated Jan. 19, 2011, pp. 1-53.
Office action for related U.S. Appl. No. 11/952,452 dated Feb. 4, 2011, pp. 1-13.
Office Action for related U.S. Appl. No. 11/952,452 dated Oct. 19, 2011, pp. 1-27.
Office Action for related U.S. Appl. No. 12/982,234 dated Oct. 19, 2011, pp. 1-53.
Office Action for related U.S. Appl. No. 11/592,460, May 23, 2012, pp. 1-103.
Office Action for related U.S. Appl. No. 11/855,419, Jun. 18, 2012, pp. 1-51.
Final Rejection for related U.S. Appl. No. 11/592,460 dated Oct. 23, 2012, pp. 1-121.
Chinese Office Action for related Chinese Patent Application No. 200780041291.7 dated Jan. 18, 2012, pp. 1-8.
Final Rejection for related U.S. Appl. No. 11/592,460 dated Feb. 24, 2012, pp. 1-119.
Final Rejection for related U.S. Appl. No. 11/855,419 dated Mar. 1, 2012, pp. 1-34.
Final Rejection for related U.S. Appl. No. 11/952,452 dated Feb. 15, 2012, pp. 1-29.
Correted European Search Report for related European Patent Application No. 12 17 1396, pp. 1-4.
European Search Report for related European Patent Application No. 12 17 1396 dated Nov. 20, 2012, pp. 1-4.
Communication pursuant to Article 94(3) EPC for corresponding European Patent Application No. 07 825 120.4-1953, dated Aug. 2, 2013, 5 pages.
Communication for corresponding European Patent Application No. 07825120.4-1229/2064634, dated Nov. 12, 2012, 8 pages.
Communication for corresponding European Patent Application No. 07825120.4 dated Nov. 22, 2012, 8 pages.

* cited by examiner

METHOD, APPARATUS AND COMPUTER PROGRAM PRODUCT FOR PROVIDING STANDARD REAL WORLD TO VIRTUAL WORLD LINKS

CROSS REFERENCE TO RELATED APPLICATION

This application claims the benefit of U.S. Provisional Application No. 60/825,921, filed Sep. 17, 2006, the contents of which are incorporated herein in their entirety.

TECHNOLOGICAL FIELD

Embodiments of the present invention relate generally to content retrieval technology and, more particularly, relate to a method, apparatus and computer program product for providing standard real world to virtual world links in a search system.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. One area in which there is a demand to increase the ease of information transfer and convenience to users relates to provision of information retrieval in networks. For example, information such as audio, video, image content, text, data, etc., may be made available for retrieval between different entities using various communication networks. Accordingly, devices associated with each of the different entities may be placed in communication with each other to locate and affect a transfer of the information. In particular, mechanisms have been developed to enable devices such as mobile terminals to conduct searches for information or content related to a particular query or keyword.

Text based searches typically involve the use of a search engine that is configured to retrieve results based on query terms inputted by a user. However, due to linguistic challenges such as words having multiple meanings, the quality of search results may not be consistently high. Additionally, data sources searched may not have information on a particular topic for which the search is being conducted.

Given the above described problems associated with text searches, other search types have been popularized. Recently, content based searches are becoming more popular with respect to visual searching. In certain situations, for example, when a user wishes to retrieve image content from a particular location such as a database, the user may wish to review images based on their content. In this regard, for example, the user may wish to review images of cats, animals, cars, etc. Although some mechanisms have been provided by which metadata may be associated with content items to enable a search for content based on the metadata, insertion of such metadata may be time consuming. Additionally, a user may wish to find content in a database in which the use of metadata is incomplete or unreliable. Accordingly, content based image retrieval solutions have been developed which utilize, for example, a classifier such as a support vector machine (SVM) to classify content based on its relevance with respect to a particular query. Thus, for example, if a user desires to search a database for images of cats, a query image could be provided of a cat and the SVM could search through the database and provide images to the user based on their relevance with respect to the features of the query image. Feedback mechanisms have also been provided to enable a user to provide feedback for further definition of a classification border between relevance and irrelevance with respect to search results.

Visual search functions such as, for example, mobile visual search functions performed on a mobile terminal, may leverage large visual databases using image matching to compare a query or input image with images in the visual databases. Image matching may tell how close the input image is to images in the visual database. The top matches (e.g., the most relevant images) may then be presented to the user by being visualized on a display of the mobile terminal. Context information associated with the image may then be provided. Accordingly, simply by pointing a camera mounted on the mobile terminal toward a particular object, the user can potentially get context information associated with the particular object. One application employing such a visual search system is described in U.S. application Ser. No. 11/592,460, entitled "Scalable Visual Search System Simplifying Access to Network and Device Functionality," the contents of which are hereby incorporated herein by reference in their entirety.

Even in instances in which a search is conducted visually, a user still generally must employ the user interface to define, direct or simply initiate the search. However, a problem that may be associated with searches conducted on a mobile terminal relates to difficulties associated with using the user interface of the mobile terminal. In this regard, it is typical for different text characters to be associated with a single key, thereby sometimes making the task of character entry seem laborious since multiple key pushes may be required for the entry of each character. Thus, entries associated with providing a text based query or entries limiting a location associated with the search may be difficult to provide thereby reducing user enjoyment and/or the utility of search services.

Accordingly, it may be advantageous to provide an improved mechanism for providing a search interface capable of curing at least some of the problems described above.

BRIEF SUMMARY

A method, apparatus and computer program product are therefore provided to establish standard real world to virtual world links in a search system such as a visual search system. In particular, a method, apparatus and computer program product are provided that establish certain functions to be executed in response to detection of corresponding real world objects in an image. Accordingly, the efficiency of user interface with devices such as mobile terminals may be improved.

In one exemplary embodiment, a method of establishing standard real world to virtual world links is provided. The method may include receiving indications of an image including an object, determining whether the object corresponds to a particular object having a predefined association based on a recognition of the object, and, in response to the object corresponding to the particular object, executing a function corresponding to the predefined association.

In another exemplary embodiment, a computer program product for establishing standard real world to virtual world links is provided. The computer program product includes at least one computer-readable storage medium having computer-readable program code portions stored therein. The computer-readable program code portions include first, second and third executable portions. The first executable portion is for receiving indications of an image including an object. The second executable portion is for determining whether the object corresponds to a particular object having a predefined association based on a recognition of the object. The third executable portion is for executing a function corresponding to the predefined association in response to the object corresponding to the particular object.

In another exemplary embodiment, an apparatus for establishing standard real world to virtual world links is provided. The apparatus may include a processing element configured to receive indications of an image including an object, determine whether the object corresponds to a particular object having a predefined association based on recognition of the object, and execute a function corresponding to the predefined association in response to the object corresponding to the particular object.

In another exemplary embodiment, an apparatus for establishing standard real world to virtual world links is provided. The apparatus includes means for receiving indications of an image including an object, means for determining whether the object corresponds to a particular object having a predefined association based on a recognition of the object, and means for executing a function corresponding to the predefined association in response to the object corresponding to the particular object.

Embodiments of the invention may provide a method, apparatus and computer program product for employment in devices to enhance the usability of a mobile terminal user interface in connection with a visual search system. As a result, for example, mobile terminals and other electronic devices may benefit from an ability to perform content retrieval in an efficient manner and provide results to the user in an intelligible and useful manner.

BRIEF DESCRIPTION OF THE SEVERAL VIEWS OF THE DRAWING(S)

Having thus described embodiments of the invention in general terms, reference will now be made to the accompanying drawings, which are not necessarily drawn to scale, and wherein:

DETAILED DESCRIPTION

Figure 1:
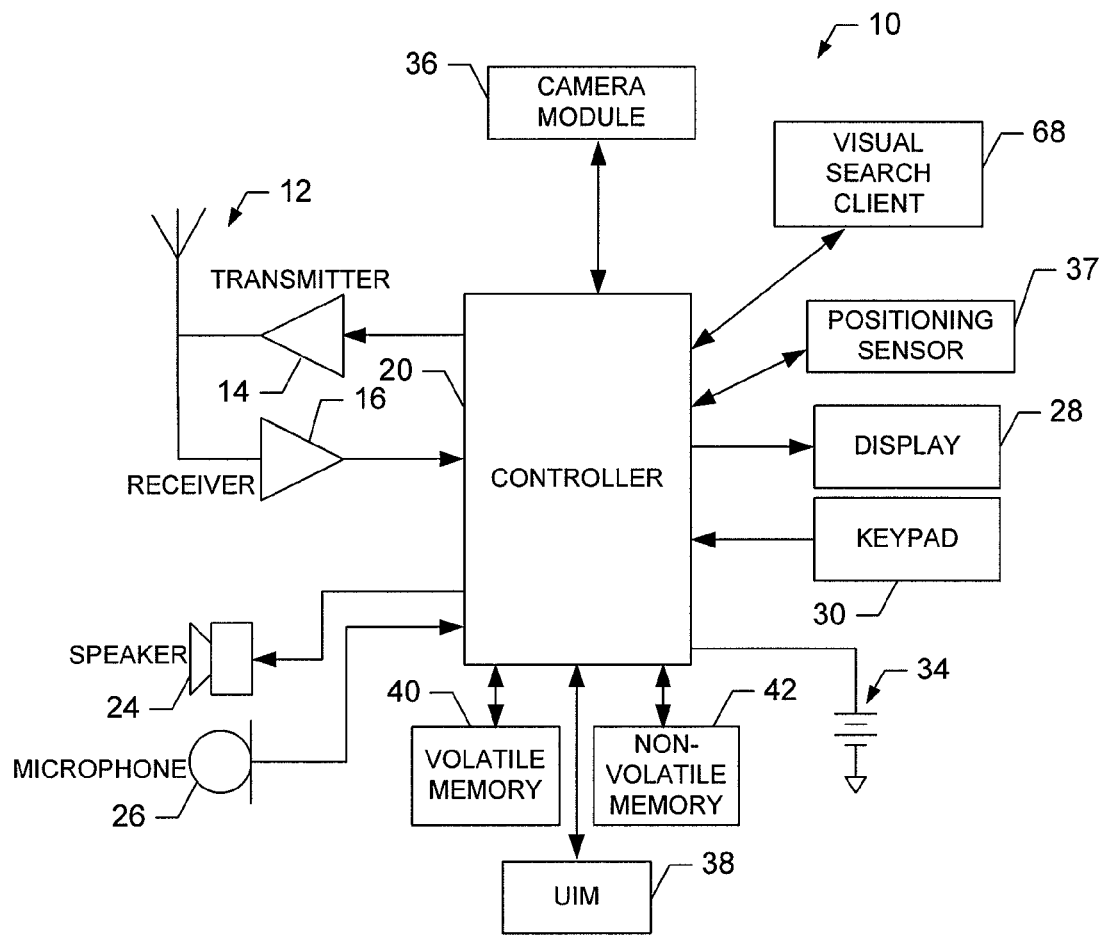
FIG. 1 is a schematic block diagram of a mobile terminal according to an exemplary embodiment of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a block diagram of a mobile terminal 10 that would benefit from embodiments of the present invention. It should be understood, however, that a mobile telephone as illustrated and hereinafter described is merely illustrative of one type of mobile terminal that would benefit from embodiments of the present invention and, therefore, should not be taken to limit the scope of embodiments of the present invention. While one embodiment of the mobile terminal 10 is illustrated and will be hereinafter described for purposes of example, other types of mobile terminals, such as portable digital assistants (PDAs), pagers, mobile computers, mobile televisions, gaming devices, laptop computers, cameras, video recorders, GPS devices and other types of voice and text communications systems, can readily employ embodiments of the present invention. Furthermore, devices that are not mobile may also readily employ embodiments of the present invention.

The system and method of embodiments of the present invention will be primarily described below in conjunction with mobile communications applications. However, it should be understood that the system and method of embodiments of the present invention can be utilized in conjunction with a variety of other applications, both in the mobile communications industries and outside of the mobile communications industries.

The mobile terminal 10 includes an antenna 12 (or multiple antennae) in operable communication with a transmitter 14 and a receiver 16. The mobile terminal 10 further includes an apparatus, such as a controller 20 or other processing element, that provides signals to and receives signals from the transmitter 14 and receiver 16, respectively. The signals include signaling information in accordance with the air interface standard of the applicable cellular system, and also user speech, received data and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with fourth-generation (4G) wireless communication protocols or the like.

It is understood that the apparatus such as the controller 20 includes circuitry desirable for implementing audio and logic functions of the mobile terminal 10. For example, the controller 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The controller 20 thus may also include the functionality to convolutionally encode and interleave message and data prior to modulation and transmission. The controller 20 can additionally include an internal voice coder, and may include an internal data modem. Further, the controller 20 may include functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as a conventional earphone or speaker 24, a microphone 26, a display 28, and a user input interface, all of which are coupled to the controller 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other hard and/or soft keys used for operating the mobile terminal 10. Alternatively, the keypad 30 may include a conventional QWERTY keypad arrangement. The keypad 30 may also include various soft keys with associated functions. In addition, or alternatively, the mobile terminal 10 may include an interface device such as a joystick or other user input interface. The mobile terminal 10 further includes a battery 34, such as a vibrating battery pack, for powering various circuits that are required to operate the mobile terminal 10, as well as optionally providing mechanical vibration as a detectable output.

In an exemplary embodiment, the mobile terminal 10 includes a media capturing element, such as a camera, video and/or audio module, in communication with the controller 20. The media capturing element may be any means for capturing an image, video and/or audio for storage, display or transmission. For example, in an exemplary embodiment in which the media capturing element is a camera module 36, the camera module 36 may include a digital camera capable of forming a digital image file from a captured image. As such, the camera module 36 includes all hardware, such as a lens or other optical component(s), and software necessary for creating a digital image file from a captured image. Alternatively, the camera module 36 may include only the hardware needed to view an image, while a memory device of the mobile terminal 10 stores instructions for execution by the controller 20 in the form of software necessary to create a digital image file from a captured image. As yet another alternative, an object or objects within a field of view of the camera module 36 may be displayed on the display 28 of the mobile terminal 10 to illustrate a view of an image currently displayed which could be captured if desired by the user. As such, as referred to hereinafter, an image could be either a captured image or an image comprising the object or objects currently displayed by the mobile terminal 10, but not necessarily captured in an image file. In an exemplary embodiment, the camera module 36 may further include a processing element such as a co-processor which assists the controller 20 in processing image data and an encoder and/or decoder for compressing and/or decompressing image data. The encoder and/or decoder may encode and/or decode according to, for example, a joint photographic experts group (JPEG) standard or other format. Additionally, or alternatively, the camera module 36 may include one or more views such as, for example, a first person camera view and a third person map view.

The mobile terminal 10 may further include a positioning sensor 37 such as, for example, a global positioning system (GPS) module in communication with the controller 20. The positioning sensor 37 may be any means, device or circuitry for locating the position of the mobile terminal 10. Additionally, the positioning sensor 37 may be any means, circuitry or device for locating the position of a point-of-interest (POI), in images captured by the camera module 36, such as for example, shops, bookstores, restaurants, coffee shops, department stores and other businesses and the like. As such, points-of-interest as used herein may include any entity of interest to a user, such as products and other objects and the like. The positioning sensor 37 may include all hardware for locating the position of a mobile terminal or a POI in an image. Alternatively or additionally, the positioning sensor 37 may utilize a memory device of the mobile terminal 10 to store instructions for execution by the controller 20 in the form of software necessary to determine the position of the mobile terminal or an image of a POI. Although the positioning sensor 37 of this example may be a GPS module, the positioning sensor 37 may include or otherwise alternatively be embodied as, for example, an assisted global positioning system (Assisted-GPS) sensor, or a positioning client, which may be in communication with a network device to receive and/or transmit information for use in determining a position of the mobile terminal 10. In this regard, the position of the mobile terminal 10 may be determined by GPS, as described above, cell ID, signal triangulation, or other mechanisms as well. In one exemplary embodiment, the positioning sensor 37 includes a pedometer or inertial sensor. As such, the positioning sensor 37 may be capable of determining a location of the mobile terminal 10, such as, for example, longitudinal and latitudinal directions of the mobile terminal 10, or a position relative to a reference point such as a destination or start point. Information from the positioning sensor 37 may then be communicated to a memory of the mobile terminal 10 or to another memory device to be stored as a position history or location information. Additionally, the positioning sensor 37 may be capable of utilizing the controller 20 to transmit/receive, via the transmitter 14/receiver 16, locational information such as the position of the mobile terminal 10 and a position of one or more POIs to a server such as, for example, a visual search server 51 and/or a visual search database 53 (see FIG. 2), described more fully below.

The mobile terminal 10 may also include a visual search client 68 (e.g., a unified mobile visual search/mapping client). The visual search client 68 may be any means, device or circuitry embodied in hardware, software, or a combination of hardware and software that is capable of communication with the visual search server 51 and/or the visual search database 53 (see FIG. 2) to process a query (e.g., an image or video clip) received from the camera module 36 for providing results including images having a degree of similarity to the query. For example, the visual search client 68 may be configured for recognizing (either through conducting a visual search based on the query image for similar images within the visual search database 53 or through communicating the query image (raw or compressed), or features of the query image to the visual search server 51 for conducting the visual search and receiving results) objects and/or points-of-interest when the mobile terminal 10 is pointed at the objects and/or POIs or when the objects and/or POIs are in the line of sight of the camera module 36 or when the objects and/or POIs are captured in an image by the camera module 36.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an electrically erasable programmable read only memory (EEPROM), flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
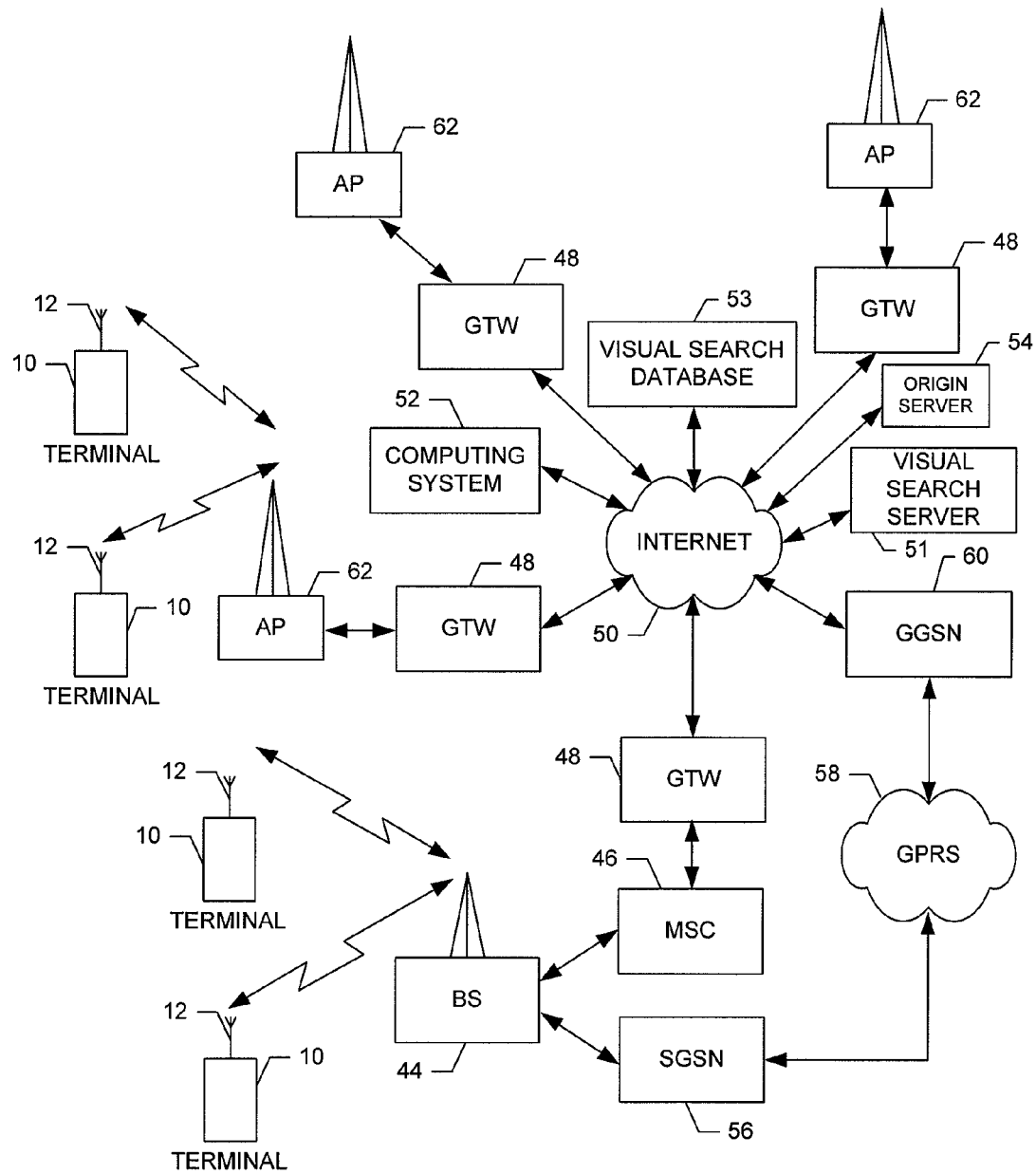
FIG. 2 is a schematic block diagram of a wireless communications system according to an exemplary embodiment of the present invention.

FIG. 2 is a schematic block diagram of a wireless communications system according to an exemplary embodiment of the present invention. Referring now to FIG. 2, an illustration of one type of system that would benefit from embodiments of the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a gateway device (GTW) 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52, origin server 54, the visual search server 51, the visual search database 53, and/or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, visual search server 51, visual search database 53, etc.) to the Internet 50, the mobile terminals 10 may communicate with the other devices and with one another, such as according to the Hypertext Transfer Protocol (HTTP) and/or the like, to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) may be capable of supporting communication in accordance with any one or more of a number of first-generation (1G), second-generation (2G), 2.5G, third-generation (3G), 3.9G, fourth-generation (4G) mobile communication protocols or the like. For example, one or more of the network(s) can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as a UMTS network employing WCDMA radio access technology. Some narrow-band analog mobile phone service (NAMPS), as well as total access communication system (TACS), network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), world interoperability for microwave access (WiMAX) techniques such as IEEE 802.16, and/or ultra wideband (UWB) techniques such as IEEE 802.15 and/or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

As will be appreciated, by directly or indirectly connecting the mobile terminals 10 and the computing system 52, the origin server 54, the visual search server 51, the visual search database 53 and/or any of a number of other devices, to the Internet 50, the mobile terminals 10 can communicate with one another, the computing system, 52, the origin server 54, the visual search server 51, the visual search database 53, etc., to thereby carry out various functions of the mobile terminals 10, such as to transmit data, content or the like to, and/or receive content, data or the like from, the computing system 52, the origin server 54, the visual search server 51, and/or the visual search database 53, etc. The visual search server 51, for example, may be embodied as one or more other servers such as, for example, a visual map server that may provide map data relating to a geographical area of one or more mobile terminals 10 or one or more points-of-interest (POI) or a POI server that may store data regarding the geographic location of one or more POI and may store data pertaining to various points-of-interest including but not limited to location of a POI, category of a POI, (e.g., coffee shops or restaurants, sporting venue, concerts, etc.) product information relative to a POI, and the like. Accordingly, for example, the mobile terminal 10 may capture an image or video clip which may be transmitted as a query to the visual search server 51 for use in comparison with images or video clips stored in the visual search database 53. As such, the visual search server 51 may perform comparisons with images or video clips taken by the camera module 36 and determine whether or to what degree these images or video clips are similar to images or video clips stored in the visual search database 53.

Although not shown in FIG. 2, in addition to or in lieu of coupling the mobile terminal 10 to computing systems 52 and/or the visual search server 51 and visual search database 53 across the Internet 50, the mobile terminal 10 and computing system 52 and/or the visual search server 51 and visual search database 53 may be coupled to one another and communicate in accordance with, for example, RF, BT, IrDA or any of a number of different wireline or wireless communication techniques, including LAN, WLAN, WiMAX, UWB techniques and/or the like. One or more of the computing system 52, the visual search server 51 and visual search database 53 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing system 52, the visual search server 51 and the visual search database 53, the mobile terminal 10 may be configured to communicate with the portable electronic devices in accordance with techniques such as, for example, RF, BT, IrDA or any of a number of different wireline or wireless communication techniques, including universal serial bus (USB), LAN, WLAN, WiMAX, UWB techniques and/or the like.

In an exemplary embodiment, content such as image content, location information and/or POI information may be communicated over the system of FIG. 2 between a mobile terminal, which may be similar to the mobile terminal 10 of FIG. 1 and a network device of the system of FIG. 2, or between mobile terminals. For example, a database may store the content at a network device of the system of FIG. 2, and the mobile terminal 10 may desire to search the content for a particular type of content. However, it should be understood that the system of FIG. 2 need not be employed for communication between mobile terminals or between a network device and the mobile terminal, but rather FIG. 2 is merely provided for purposes of example. Furthermore, it should be understood that embodiments of the present invention may be resident on a communication device such as the mobile terminal 10, or may be resident on a network device or other device accessible to the communication device.

Figure 3:
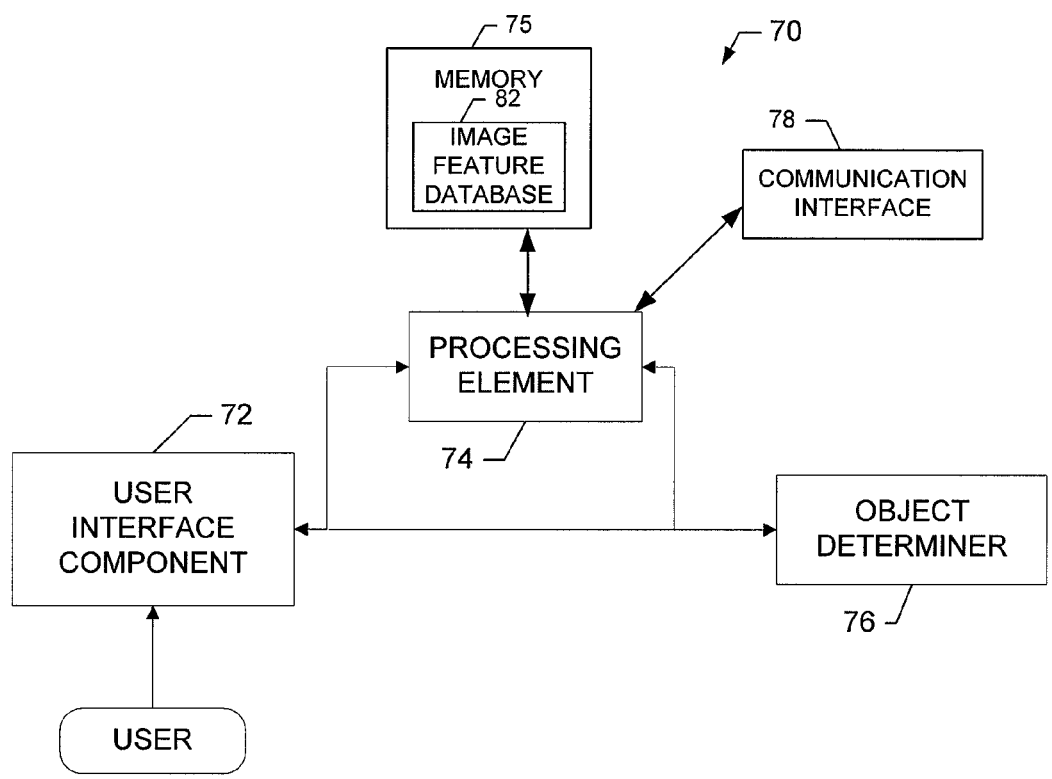
FIG. 3 illustrates a block diagram of an apparatus for providing standard real world to virtual world links in a search system according to an exemplary embodiment of the present invention.

FIG. 3 illustrates a block diagram of an apparatus for providing standard real world to virtual world links for use in a search system according to an exemplary embodiment of the present invention. The apparatus of FIG. 3 will be described, for purposes of example, in connection with the mobile terminal 10 of FIG. 1. However, it should be noted that the apparatus of FIG. 3 may also be employed in connection with a variety of other devices, both mobile and fixed, and therefore, embodiments of the present invention should not be limited to application on devices such as the mobile terminal 10 of FIG. 1. In this regard, embodiments may also be practiced in the context of a client-server relationship in which the client (e.g., the visual search client 68) issues a query to the server (e.g., the visual search server 51) and the server practices embodiments of the present invention and communicates results to the client. Alternatively, some functions described below may be practiced on the client, while others are practiced on the server. Decisions with regard to what processes are performed at which device may typically be made in consideration of balancing processing costs and communication bandwidth capabilities. It should also be noted, that while FIG. 3 illustrates one example of a configuration of an apparatus for providing standard real world to virtual world links, numerous other configurations may also be used to implement embodiments of the present invention.

Referring now to FIG. 3, a search apparatus 70 for providing standard real world to virtual world links is provided. In exemplary embodiments, the search apparatus 70 may be embodied at either one or both of the mobile terminal 10 (e.g., as the visual search client 68) and the visual search server 51 (or another network device). In other words, portions of the search apparatus 70 may be resident at the mobile terminal 10 while other portions are resident at the visual search server 51. Alternatively, the search apparatus 70 may be resident entirely on the mobile terminal 10 and/or the visual search server 51. The search apparatus 70 may include a user interface component 72, a processing element 74, a memory 75, an object determiner 76 and a communication interface 78. In an exemplary embodiment, the processing element 74 could be embodied as the controller 20 of the mobile terminal 10 of FIG. 1 or as a processor or controller of the visual search server 51. However, alternatively, the processing element 74 could be a processing element of a different device. Processing elements as described herein may be embodied in many ways. For example, the processing element 74 may be embodied as a processor, a coprocessor, a controller or various other processing means, circuits or devices including integrated circuits such as, for example, an ASIC (application specific integrated circuit). In an exemplary embodiment, the user interface component 72, the object determiner 76 and/or the communication interface 78 may be controlled by or otherwise embodied as the processing element 74.

The communication interface 78 may be embodied as any device, circuitry or means embodied in either hardware, software, or a combination of hardware and software that is configured to receive and/or transmit data from/to a network and/or any other device or module in communication with an apparatus (e.g., the search apparatus 70) that is employing the communication interface 78. In this regard, the communication interface 78 may include, for example, an antenna and supporting hardware and/or software for enabling communications via a wireless communication network. Additionally or alternatively, the communication interface 78 may be a mechanism by which location information and/or indications of an image (e.g. a query) may be communicated to the processing element 74 and/or the object determiner 76. Accordingly, in an exemplary embodiment, the communication interface 78 may be in communication with a device such as the camera module 36 (either directly or indirectly via the mobile terminal 10) for receiving the indications of the image and/or with a device such as the positioning sensor 37 for receiving location information identifying a position or location of the mobile terminal 10.

The user interface component 72 may be any device, means or circuitry embodied in either hardware, software, or a combination of hardware and software that is capable of receiving user inputs and/or providing an output to the user. The user interface component 72 may include, for example, a keyboard, keypad, function keys, mouse, scrolling device, touch screen, or any other mechanism by which a user may interface with the search apparatus 70. The user interface component 72 may also include a display, speaker or other output mechanism for providing an output to the user. In an exemplary embodiment, rather than including a device for actually receiving the user input and/or providing the user output, the user interface component 72 could be in communication with a device for actually receiving the user input and/or providing the user output. As such, the user interface component 72 may be configured to receive indications of the user input from an input device and/or provide messages for communication to an output device. In this regard, the user interface component 72 may be a portion of or embodied as the communication interface 78.

In an exemplary embodiment, the user interface component 72 may be configured to receive indications of an image from the user. The indications of the image may be, for example, an image currently within the field of view of the camera module 36 (although not necessarily captured) or captured image including content providing a basis for a content based retrieval operation. In other words, the indications of the image may be a newly created image that the user has captured at the camera module 36 or merely an image currently being displayed on a viewfinder (or display) of the device employing the camera module 36. In alternative embodiments, the indications of the image could include a raw image, a compressed image (e.g., a JPEG image), or features extracted from an image. Any of the raw image, compressed image or features from an image could form the basis for a search among the contents of the memory 75.

The memory 75 (which may be a volatile or nonvolatile memory) may include an image feature database 82. In this regard, for example, the image feature database 82 may include source images or features of source images for comparison to the indications of the image (e.g., an image captured by or in the viewfinder of the camera module 36). As indicated above, the memory 75 could be remotely located from the mobile terminal 10 or partially or entirely located within the mobile terminal 10. As such, the memory 75 may be memory onboard the mobile terminal 10 or accessible to the mobile terminal 10 that may have capabilities similar to those described above with respect to the visual search database 53 and/or the visual search server 51. Alternatively, the memory 75 could be embodied as the visual search database 53 and/or the visual search server 51. In an exemplary embodiment, at least some of the images stored in the memory 75 may be source images associated with objects having a predefined association. In this regard, the predefined association may map a particular object (e.g., a car) to a particular function (e.g., a link to traffic information). In one embodiment, the memory 75 may store a plurality of predefined associations, for example, in a list. Thus, once indications of a particular image are matched to a source image (e.g., by the processing element 74 or the object determiner 76). The list may be consulted by the processing element 74 to determine whether the object associated with the source image (and therefore also associated with the image) has a corresponding predefined association.

The object determiner 76 may be any device, circuit or means embodied in either hardware, software, or a combination of hardware and software that is configured to determine whether the indications of the image include an object that corresponds to an object associated with a source image based on a visual search. In this regard, the object determiner 76 may, in one exemplary embodiment, include an algorithm, device or other means for performing content based searching with respect to indications of an image received (e.g., a raw image, a compressed image, and/or features of an image) by comparing the indications of the image, which may include an object or features of the object, to other images in the memory 75 (e.g., the image feature database 82). As such, the object determiner 76 may be configured to compare the indications of the image to source images to find a source image substantially matching the indications of the image with regard to at least one feature (e.g., corresponding to features of the object). Accordingly, an object associated with the image may be correlated to a particular object associated with the source image in which the particular object has a corresponding predefined association.

In an exemplary embodiment, once the object in the image has been identified (e.g., by the correlation mechanism described above or by another known mechanism), if the object corresponds to the particular object having the predefined association, the processing element 74 may be configured to (or may comprise execution circuitry configured to) execute a function corresponding to the predefined association. In some cases, the function may include executing a link. The link may be to, for example, a web site, a phone number, an email address, a yellow pages entry, a keyword, a document, a radio station, a television channel, a music library, certain content, a particular application and state, or the like. Alternatively, the link may launch an application, execute a function of the mobile terminal 10 (e.g., placing a call or sending a text message or email, etc.), execute a function of a computer, etc. The link could alternatively be empty or nonexistent.

In some exemplary embodiments, each link may include a title. Alternatively, the title may be provided without a link. The title may, for example, be provided in multiple different languages and/or be provided as any text entry associated with the particular object. In one embodiment, location information (e.g., from the positioning sensor 37) may be used to determine which language or languages are most likely to be recognized based on the location information and the title may only be presented in the determined likely language(s). Alternatively, the user may select one of the multiple languages of the title and subsequent information may be presented in the selected language. Actual information (e.g., product information, schedule information, service information, and the like) may be directly associated with the title and/or the link or may be self-standing (e.g., not associated with a particular link or title). In this regard, for example, the actual information may be provided in a banner. The banner may be defined as a piece of information that may be directly displayed by a device executing the function. For example, the banner may be displayed on a view finder of a camera or on the display of a mobile phone, etc. The banner may be static or dynamic (e.g., moving, flashing, rotating, etc.). In some embodiments, the banner may be an advertisement.

According to embodiments of the present invention, the predefined associations may act, for example, like an icon on a standard computer desktop insofar as, similar to clicking on an icon which establishes a link to corresponding functionality, identifying an object within an image that is defined to correspond to a predefined association may establish a link to corresponding functionality defined for execution by the predefined association without further operator input (e.g., automatically). As such, links may be established between real world objects (e.g., a building, an entity, a person, a logo, a label, any other object or concept, or the like) and virtual world items (actions, information, web sites, phone numbers, addresses, etc.). Examples of certain predefined associations are provided below. However, it should be understood that the examples below are provided by way of example and not of limitation. Such examples include:

a sky object, a window object having at least a partial sky view, or a cloud object having an association with weather information;

a street object, a street sign object, a car object, or a street light object having an association with traffic information;

a street object, a street sign object, or a car door object having an association with ordering a taxi;

a transportation company logo object or a public transportation schedule object having an association with transportation time schedules;

a transportation company logo object or a public transportation schedule object having an association with transportation information;

an airline logo object or an airplane object having an association with flight information;

an airline logo object or an airplane object having an association with accessing airline service hotlines;

a courier service logo object having an association with accessing shipping information;

a parking meter object having an association with accessing parking information, paying parking or other tickets, conducting emergency calls, storing information related to paying for parking services, or obtaining access pointers to nearby parking spots;

a restaurant front, facade, door, label, logo, menu or other restaurant-related object having an association with access to restaurant reviews, menu information, directions to a particular restaurant or alternative restaurants close-by, retrieval of a reminder through any media about a restaurant (e.g. email, SMS, MMS, website pointer, etc.);

a clock or watch object having an association with receiving access to world-times, calendar or other similar information;

a newspaper stand, newspaper or newspaper box object having an association to accessing or viewing any kind of news, blog or informational service;

fronts of sites, buildings or other point of interest objects having an association to accessing information about the site, building or point of interest, respectively;

a DVD, CD, tape, cover, other data storage, TV, radio, video player (e.g., DVD, VHS, etc.), or other entertainment device objects having an association to enabling access to TV guides, radio guides purchasing movies or music, reading reviews or consumption/purchase of other entertainment content;

a product label or price tag object having an association with enabling access to product price information, product reviews, comparison shopping information, promotional information, directions to retailer/dealer locations, online shopping venues for purchasing items (e.g., items matching the product label object or sharing the same type or brand);

a car or other vehicle object having an association with enabling access to information (e.g., product information, maintenance information, etc.) about a corresponding particular car or other vehicle type, enabling access to information regarding directions to a corresponding dealership, enabling access to information for purchasing the car or other vehicle; enabling retrieval of a call from a sales representative or other party, or enabling retrieval of a reminder;

a particular recognized person having an association with enabling access to information about the particular recognized person (e.g., community profile, social networking profile, blog, personal website, etc.) or access to information used to transfer money to or receive money from the particular recognized person;

a restaurant, bar or other public space object having an association with providing another party with an invitation to a location of the corresponding restaurant, bar or other public space;

a poster object having an association with enabling receipt of calls, purchase of products, or access to information about an item advertised in the poster;

a shirt or ironing board object having an association with finding a local cleaner or dry cleaner;

a movie poster object having an association with enabling access to viewing movie trailers, reading movie reviews, purchasing movie tickets, purchasing ring-tones, purchasing other digital content;

a corporate logo object having an association with enabling access to company information; or a logo of a service provider object having an association with enabling access to a self-servicing portal associated with the service provider, or enabling execution of a call to the service provider (e.g., a hotline number).

Accordingly, in an exemplary embodiment, in response to receipt of indications of an image that includes an object, the processing element 74 (e.g., via control of the object determiner 76) may be configured to determine whether the object corresponds to a particular object having a predefined association. In this regard, the image may be processed to determine whether other images (e.g. source images) have matching features. When a match is found, the object may be defined based on the matching image. The determination as to whether the object corresponds to the particular object having the predefined association may then be made, for example, by determining whether the object is in a list (e.g., stored in the memory 75 or another location accessible to the processing element 74) of predefined associations. In response to a determination that the predefined association exists, a corresponding function may be performed. As such, the list may include, for example, the object and the corresponding function (or instructions for executing the corresponding function). The performance of the function may provide the retrieval of information, accessing of information, or other functions. In some embodiments, the processing element 74 may also receive location information indicative of a location associated with a user providing the indications of the image (e.g., the location of the device obtaining the image) and information retrieved or accessed may be based at least in part on the location information. For example, weather, traffic and other types of information may be tailored to a city, or area within the city at which the user is located.

In an exemplary embodiment, some objects may have multiple predefined associations. Accordingly, the user interface component 72 may also be configured to receive input or feedback from the user with regard to selection of one particular association if multiple standard associations are provided for a given identified object.

Figure 4:
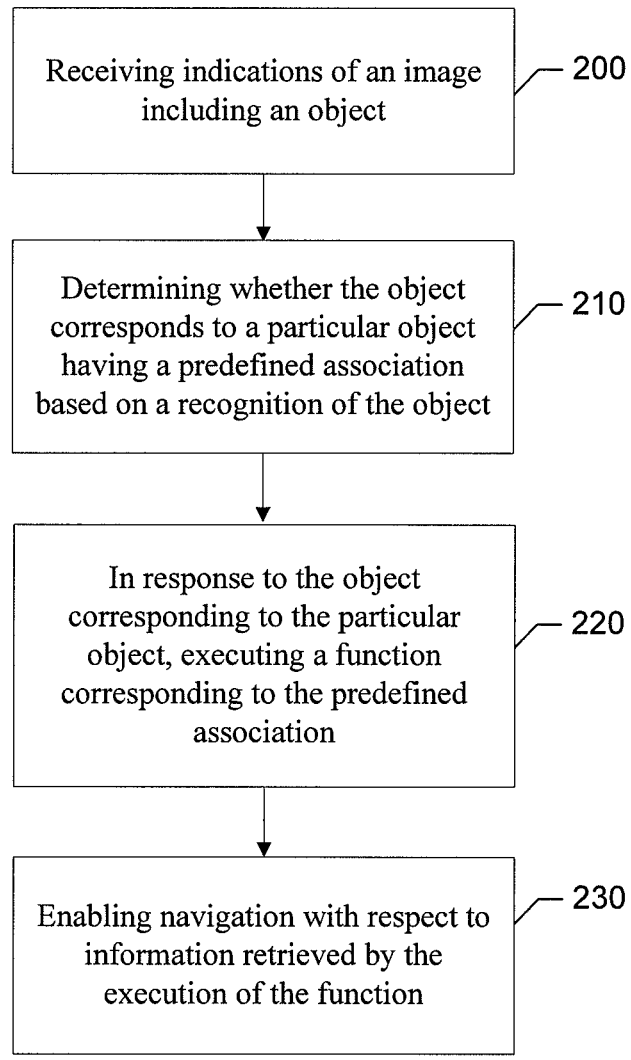
FIG. 4 is a flowchart according to an exemplary method for providing standard real world to virtual world links in a search system according to an exemplary embodiment of the present invention.

FIG. 4 is a flowchart of a method and program product according to exemplary embodiments of the invention. It will be understood that each block or step of the flowcharts, and combinations of blocks in the flowcharts, can be implemented by various means, such as hardware, firmware, and/or software including one or more computer program instructions. For example, one or more of the procedures described above may be embodied by computer program instructions. In this regard, the computer program instructions which embody the procedures described above may be stored by a memory device of a mobile terminal or server and executed by a built-in processor in a mobile terminal or server. As will be appreciated, any such computer program instructions may be loaded onto a computer or other programmable apparatus (i.e., hardware) to produce a machine, such that the instructions which execute on the computer or other programmable apparatus create means for implementing the functions specified in the flowcharts block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowcharts block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowcharts block(s) or step(s).

Accordingly, blocks or steps of the flowcharts support combinations of means for performing the specified functions, combinations of steps for performing the specified functions and program instruction means for performing the specified functions. It will also be understood that one or more blocks or steps of the flowcharts, and combinations of blocks or steps in the flowcharts, can be implemented by special purpose hardware-based computer systems which perform the specified functions or steps, or combinations of special purpose hardware and computer instructions.

In this regard, one embodiment of a method for providing standard real world to virtual world links as illustrated, for example, in FIG. 4, may include receiving indications of an image including an object at operation 200. At operation 210, a determination may be made as to whether the object corresponds to a particular object having a predefined association based on recognition of the object. In response to the object corresponding to the particular object, a function may be executed corresponding to the predefined association at operation 220. In an exemplary embodiment, the function executed may include retrieving information corresponding to a topic associated with the object via the predefined association. The information could, for example, correspond to a location of a device providing the indications of the image. In an exemplary embodiment, the method may further include an optional operation 230 of enabling navigation with respect to information retrieved.

In an exemplary embodiment, determining whether the object corresponds to the particular object may include comparing features of the image to source images including object features to find a corresponding object having features matching the features of the image and determining whether the corresponding object is in a list of particular objects having respective predefined associations. The function executed could alternatively include executing a link to a predefined destination, displaying a title describing the predefined association, or displaying a banner.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method comprising:
   receiving indications of an image including an object at a mobile terminal;
   determining to identify, at the mobile terminal, whether the object corresponds to a particular real life object having a predefined association mapping the particular real life object to a function based, at least in part, on a recognition of the object; and
   in response to the object corresponding to the particular real life object, determining to execute at the mobile terminal the function corresponding to the predefined association by executing a link to a predetermined destination and causing, at least in part, a display of a title describing the predefined association of the real life object and the function,
   wherein the function includes retrieving information corresponding to a location of a camera providing the indications of the image, and the information defines an environment condition or another real life object, other than the object or the camera, associated with the location, and
   wherein the determining whether the object corresponds to the particular real life object comprises comparing features of the image to source images including object features to find a corresponding object having features matching the features of the image and determining whether the corresponding object is in a list of particular objects having respective predefined associations.

2. The method of claim 1, wherein executing the function comprises placing a call, sending a text message or email, or a combination thereof corresponding to a location of a camera providing the indications of the image.

3. The method of claim 1, wherein the link is a phone number, a yellow pages entry, a document, or a radio station, the title is provided as text entry associated with the particular real life object, and executing the function further comprises displaying a banner.

4. The method of claim 1, wherein executing the function comprises retrieving information corresponding to a topic associated with the object via the predefined association.

5. The method of claim 4, further comprising enabling navigation with respect to information retrieved.

6. The method of claim 1, wherein the identified object and the predefined association further include one or more selections from the group consisting of:
- a sky, a window having at least a partial sky view, or a cloud having an association with weather information;
- a street, a street sign, or a street light having an association with traffic information;
- a street, or a street sign having an association with ordering a taxi;
- a printed transportation company logo or a printed public transportation schedule having an association with transportation time schedules;
- a printed transportation company logo or a printed public transportation schedule having an association with transportation information;
- a printed airline logo object or an airplane having an association with flight information;
- a printed airline logo or an airplane having an association with accessing airline service hotlines;
- a printed courier service logo having an association with accessing shipping information;
- a clock or watch having an association with receiving access to world-times, calendar or other similar information;
- a newspaper stand, newspaper or newspaper box having an association with accessing or viewing any kind of news, blog or informational service;
- fronts of sites, buildings or other points of interest having an association with accessing information about the site, building or point of interest, respectively;
- a particular recognized person having an association with enabling access to information about the particular recognized person or access to information used to transfer money to or receive money from the particular recognized person;
- a restaurant, bar or other public space having an association with providing another party with an invitation to a location of the corresponding restaurant, bar or other public space; and
- a shirt or ironing board having an association with finding a local cleaner or dry cleaner.

7. The method of claim 1, wherein the identified object further includes a parking meter, and the predefined association is between the parking meter and accessing parking information, paying parking or other tickets, storing information related to paying for parking services, obtaining access pointers to nearby parking spots, or a combination thereof.

8. The method of claim 1, wherein the another real life object is absent from the image.

9. The method of claim 1, wherein the information defines the environment condition associated with the location, and the environment condition includes weather, traffic, or a combination thereof.

10. The method of claim 1, wherein the particular real life object has a plurality of predefined associations mapping the particular real life object to functions based on the recognition of the object.

11. A non-transitory computer-readable storage medium carrying one or more sequences of one or more instructions which, when executed by one or more processors, cause a mobile terminal to at least perform the following steps:
- receiving indications of an image including an object;
- determining to identify whether the object corresponds to a particular real life object having a predefined association mapping the particular real life object to a function based, at least in part, on a recognition of the object; and
- in response to the object corresponding to the particular real life object, determining to execute the function corresponding to the predefined association by executing a link to a predetermined destination and causing, at least in part, a display of a title describing the predefined association of the real life object and the function,
- wherein the function includes retrieving information corresponding to a location of a camera providing the indications of the image, and the information defines an environment condition or another real life object, other than the object or the camera, associated with the location,
- wherein the mobile terminal is caused to further perform:
- comparing features of the image to source images including object features to find a corresponding object having features matching the features of the image and determining whether the corresponding object is in a list of particular objects having respective predefined associations.

12. The non-transitory computer-readable storage medium of claim 11, wherein the mobile terminal is caused to further perform:
- placing a call, sending a text message or email, or a combination thereof corresponding to a location of a camera providing the indications of the image.

13. The non-transitory computer-readable storage medium of claim 11, wherein the identified object and the predefined association further include one or more selections from the group consisting of:
- a sky, a window having at least a partial sky view, or a cloud having an association with weather information;
- a street, a street sign, or a street light having an association with traffic information;
- a street, or a street sign having an association with ordering a taxi;
- a printed transportation company logo or a printed public transportation schedule having an association with transportation time schedules;
- a printed transportation company logo or a printed public transportation schedule having an association with transportation information;
- a printed airline logo object or an airplane having an association with flight information;
- a printed airline logo or an airplane having an association with accessing airline service hotlines;
- a printed courier service logo having an association with accessing shipping information;
- a parking meter having an association with accessing parking information, paying parking or other tickets, storing information related to paying for parking services, or obtaining access pointers to nearby parking spots;
- a clock or watch having an association with receiving access to world-times, calendar or other similar information;
- a newspaper stand, newspaper or newspaper box having an association with accessing or viewing any kind of news, blog or informational service;

fronts of sites, buildings or other points of interest having an association with accessing information about the site, building or point of interest, respectively;

a particular recognized person having an association with enabling access to information about the particular recognized person or access to information used to transfer money to or receive money from the particular recognized person;

a restaurant, bar or other public space having an association with providing another party with an invitation to a location of the corresponding restaurant, bar or other public space; and a shirt or ironing board having an association with finding a local cleaner or dry cleaner.

14. An apparatus comprising:

at least one processor; and at least one memory including computer program code, the at least one memory and the computer program code configured to, with the at least one processor, cause a mobile terminal to perform at least the following, receive indications of an image including an object;

determine to identify whether the object corresponds to a particular real life object having a predefined association mapping the particular real life object to a function based, at least in part, on a recognition of the object; and in response to the object corresponding to the particular real life object, determine to execute the function corresponding to the predefined association by executing a link to a predetermined destination and cause, at least in part, a display of a title describing the predetermined association of the real life object and the function, wherein the function includes retrieving information corresponding to a location of a camera providing the indications of the image, and the information defines an environment condition or another real life object, other than the object or the camera, associated with the location, and wherein the mobile terminal is further caused to compare features of the image to source images including object features to find a corresponding object having features matching the features of the image and determine whether the corresponding object is in a list of particular objects having respective predefined associations.

15. The apparatus of claim 14, wherein the mobile terminal is further caused to place a call, send a text message or email, or a combination thereof corresponding to a location of a camera providing the indications of the image.

16. The apparatus of claim 14, wherein the link is a phone number, a yellow pages entry, a document, or a radio station, the title is provided as text entry associated with the particular real life object, and executing the function further comprises displaying a banner.

17. The apparatus of claim 14, wherein the mobile terminal is further caused to retrieve information corresponding to a topic associated with the object via the predefined association.

18. The apparatus of claim 17, wherein the mobile terminal is further caused to enable navigation with respect to information retrieved.

19. The apparatus of claim 14, wherein the identified object and the predefined association further include one or more selections from the group consisting of:

a sky, a window having at least a partial sky view, or a cloud having an association with weather information;

a street, a street sign, or a street light having an association with traffic information;

a street, or a street sign having an association with ordering a taxi;

a printed transportation company logo or a printed public transportation schedule having an association with transportation time schedules;

a printed transportation company logo or a printed public transportation schedule having an association with transportation information;

a printed airline logo object or an airplane having an association with flight information;

a printed airline logo or an airplane having an association with accessing airline service hotlines;

a printed courier service logo having an association with accessing shipping information;

a parking meter having an association with accessing parking information, paying parking or other tickets, storing information related to paying for parking services, or obtaining access pointers to nearby parking spots;

a clock or watch having an association with receiving access to world-times, calendar or other similar information;

a newspaper stand, newspaper or newspaper box having an association with accessing or viewing any kind of news, blog or informational service;

fronts of sites, buildings or other points of interest having an association with accessing information about the site, building or point of interest, respectively;

a restaurant, bar or other public space having an association with providing another party with an invitation to a location of the corresponding restaurant, bar or other public space; and a shirt or ironing board having an association with finding a local cleaner or dry cleaner.

20. A mobile terminal comprising:

a receiver which receives indications of an image including an object;

a position sensor that determines a location of the mobile terminal;

at least one processor; and at least one memory including computer program code, the at least one memory and the computer program code configured to, with the at least one processor, cause a mobile terminal to perform at least the following, identify whether the object corresponds to a particular real life object having a predefined association mapping the particular real life object to a function based, at least in part, on a recognition of the object, wherein in response to the object corresponding to the particular real life object, the controller executes the function corresponding to the predefined association by executing a link to a predetermined destination and causes, at least in part, a display of a title describing the predefined association of the real life object and the function, wherein the function includes retrieving information corresponding to a location of a camera providing the indications of the image, and the information defines an environment condition or another real life object, other than the object or the camera, associated with the location, and wherein the mobile terminal is further caused to compare features of the image to source images including object features to find a corresponding object having features matching the features of the image and determine whether the corresponding object is in a list of particular objects having respective predefined associations.

* * * * *